United States Patent [19]

Hlava

[11] Patent Number: 4,760,973

[45] Date of Patent: Aug. 2, 1988

[54] CAM IN THUMBSTOP FOR SPIN CAST REELS

[75] Inventor: Lorens G. Hlava, Tulsa, Okla.

[73] Assignee: Brunswick Corporation, Skokie, Ill.

[21] Appl. No.: 889,802

[22] Filed: Jul. 23, 1986

[51] Int. Cl.[4] .............................................. A01K 89/01
[52] U.S. Cl. ................................................ 242/84.2 A
[58] Field of Search ..................... 242/84.2 R, 84.2 A, 242/84.21 A; 74/470, 519

[56] References Cited

U.S. PATENT DOCUMENTS

| 3,123,318 | 3/1964 | Wood | 242/84.2 A |
| 3,284,019 | 11/1966 | Wood | 242/84.21 A |
| 4,154,413 | 5/1979 | Hull | 242/84.2 A |
| 4,180,217 | 12/1979 | Harre et al. | 242/84.2 A |
| 4,408,729 | 10/1983 | Moss et al. | 242/84.5 A |
| 4,415,129 | 11/1983 | Neufeld | 242/84.2 A |

Primary Examiner—Daniel P. Stodola
Attorney, Agent, or Firm—Wood, Dalton, Phillips, Mason & Rowe

[57] ABSTRACT

According to the invention, cooperating structure is provided on the housing and thumb button of a fishing reel so that the thumb button can be assembled and disassembled only with the thumb button in a position outside of the range of pivoting of the thumb button during reel operation. The thumb button has lateral edges and on each edge a pivot post and guide seat. The housing has a pivot post and guide seat adjacent laterally spaced edges bounding an opening for the thumb button. The seats receive and guide pivoting of the posts throughout the operating range for the thumb button.

13 Claims, 1 Drawing Sheet

CAM IN THUMBSTOP FOR SPIN CAST REELS

DESCRIPTION

1. Technical Field

This invention relates to spin cast style fishing reels and, more particularly, to structure for mounting a thumb button for pivoting movement relative to the reel housing.

2. Background Art

In conventional spin cast style reels, a thumb button is commonly mounted in an opening in the reel housing for pivoting movement in a fore and aft direction. The user, upon depressing the thumb button, causes the thumb button to engage a center shaft and shift the center shaft and associated winding cup assembly forwardly to trap the line against an inside surface of the reel housing at the initiation of a cast.

One exemplary structure for mounting the thumb button comprises a pair of spaced, forwardly opening, curved seats for accepting laterally oppositely projecting circular pivot pins on the sides of the thumb button. There is a restriction at the entryway for the seats so that the pivot pins and/or restrictions must be deformed upon introducing the pivot pins into the seats, thereby establishing a snap-fit connection.

The problem with the conventional snap-fit thumb button is that the pressure applied in operating the thumb button tends to dislodge the pivot pins on the thumb button from their seats, resulting in the separation of the thumb button from the reel housing. Once this occurs, the user must disassemble the reel and replace the thumb button. If this occurs an excessive number of times, the resiliency of the housing and/or pivot pins may be destroyed.

SUMMARY OF THE INVENTION

The present invention is specifically directed to overcoming the above problem in a novel and simple manner.

According to the invention, cooperating structure is provided on the housing and thumb button so that the thumb button can be assembled and disassembled only with the thumb button in a position outside of the range of pivoting of the thumb button during reel operation. Inadvertent separation of the thumb button during use is thus prevented.

In a preferred form of the invention, the thumb button has lateral edges and on each edge a pivot post and guide seat. The housing has a pivot post and guide seat adjacent laterally spaced edges bounding an opening for the thumb button. Preferably, the posts and seats are arranged so that the thumb button can be assembled with the thumb button pivoted forwardly beyond its extreme forward position in the operating range therefor. Further, in this position, at least two of the four posts must be cammed into their respective seat.

With the inventive structure, the thumb button is easily assembled by a snap-fit operation. The four pivot posts, cooperating with the seats, prevent separation of the thumb button throughout its operating range. The cooperating pivot pins and seats at the same time smoothly guide pivoting of the thumb button.

DETAILED DESCRIPTION OF THE DRAWINGS

Figure 1:
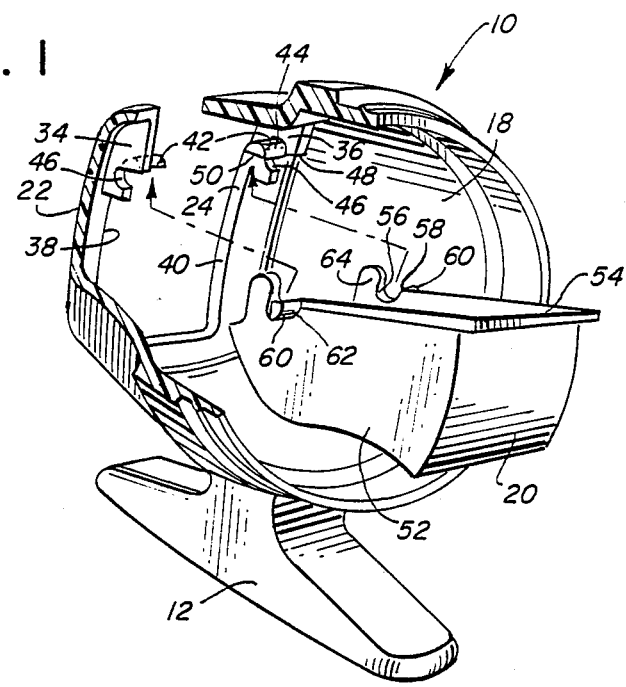
FIG. 1 is a perspective view of the rear portion of a reel housing with structure for mounting a thumb button according to the present invention.

FIG. 1 depicts at 10 the rear portion of a reel housing for a conventional style spin cast reel. The rear reel portion 10 is generally molded in plastic and takes a generally cup-shaped configuration, opening forwardly of the reel. The housing portion 10 has an integrally formed mounting foot 12 for connecting the reel to a fishing rod (not shown).

One exemplary reel mechanism with which the rear reel portion 10 is typically used is shown in U.S. Pat. No. 4,408,729, to Moss et al. The details of the reel operation are described fully in Moss et al, however, knowledge of the operation of the overall reel mechanism is not important in understanding the instant invention.

Figure 2:
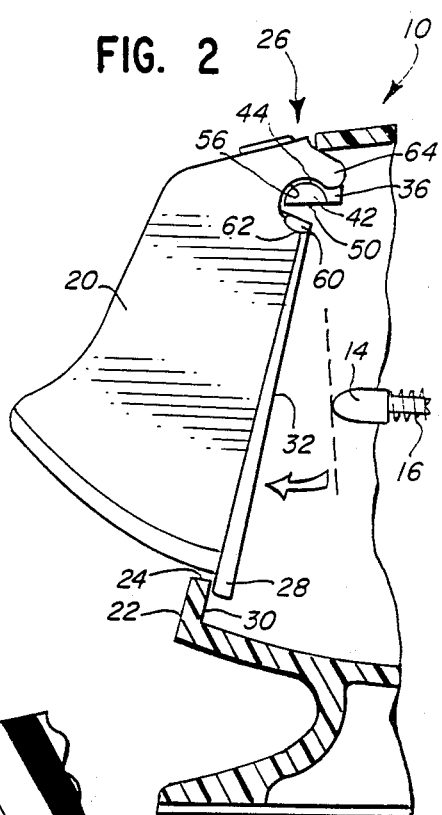
FIG. 2 is a fragmentary sectional view of the thumb button assembled to the housing and in its rearwardmost position.
Figure 3:
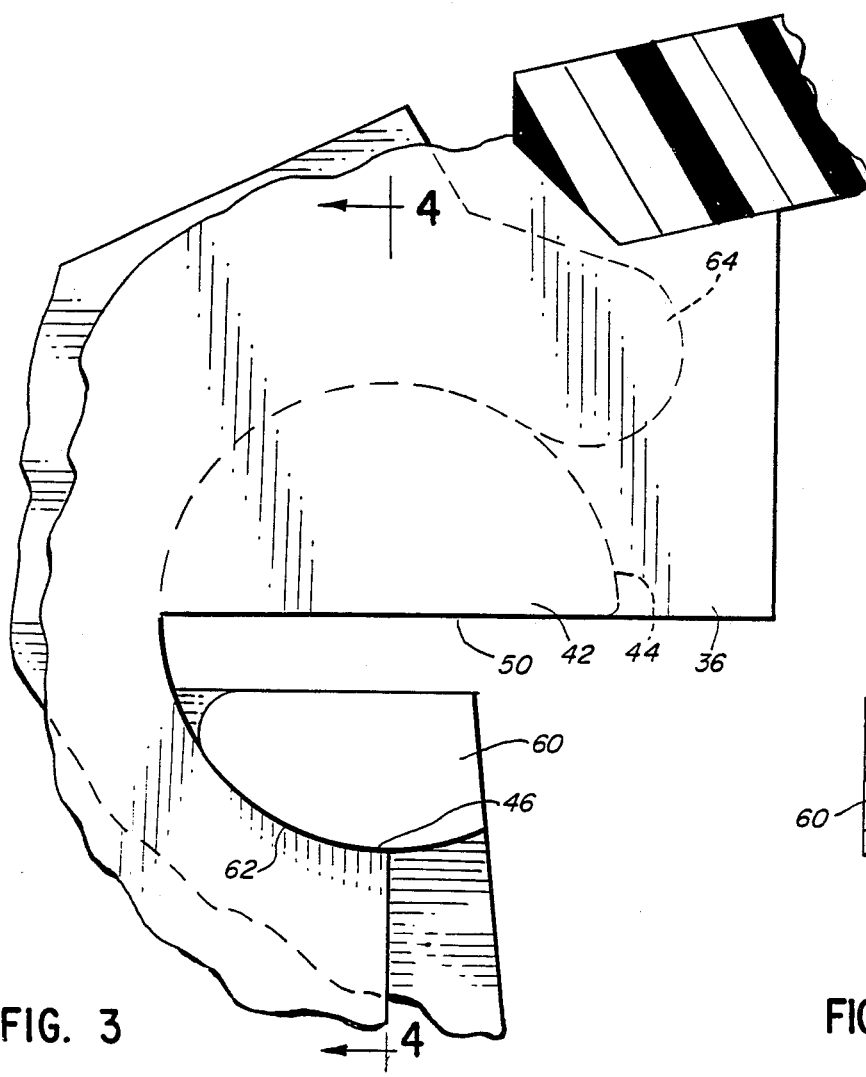
FIG. 3 is an enlarged, sectional view of the inventive structure for connecting the thumb button and reel housing.
Figure 4:
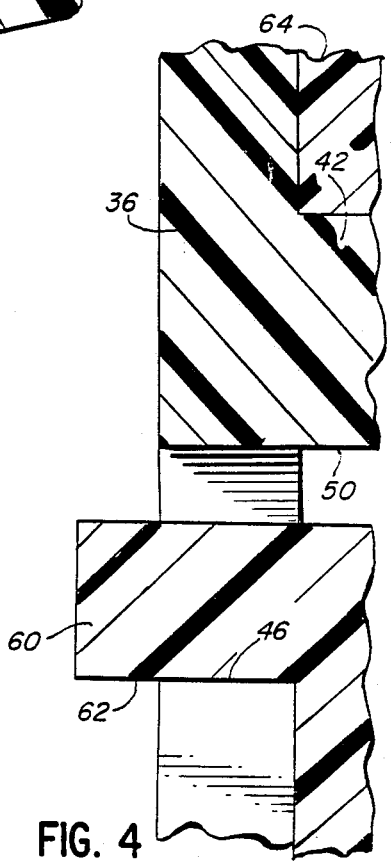
FIG. 4 is a sectional view of the connection between the thumb button and reel housing along line 4—4 of FIG. 3.

Generally, the spin-cast reel shown in Moss et al has a spinner head assembly and associated therewith a longitudinally extending center shaft at 14 (FIG. 2). The center shaft is biased by a coil spring 16 rearwardly of the reel and projects into a cavity 18 bounded by the rear housing portion 10. At the initiation of a cast, the center shaft 14 is moved against the bias of spring 16 forwardly of the reel, thus bringing the spinner head assembly against an inside surface of the front reel cover to snub the fishing line. Forward movement of the center shaft 14 is accomplished by depressing a thumb button 20, thereby pivoting the thumb button against the center shaft and moving the centershaft forwardly of the reel.

As seen clearly in FIGS. 1 and 2, the rear reel housing portion 10 has a back wall 22 with a rectangular opening 24 therein. The thumb button 20 is suspended adjacent the upper portion of the opening 24 for pivoting movement relative to the housing portion 10 through a pivot assembly at 26. With the thumb button assembled as in FIG. 2, rearward pivoting of the thumb button as confined by a depending wall 28 which encounters a forwardly facing surface 30 on the back wall 22 of the housing portion 10. Upon the thumb button being depressed and pivoting forwardly through the pivot assembly 26, a forwardly facing surface 32 on the thumb button engages the center shaft. Further pivoting of the thumb button urges the center shaft to its forwardmost operating position. The range of movement of the thumb button is shown between the solid and phantom line positions for the thumb button shown in FIG. 2.

The details of the connection of the thumb button to the housing portion 10 are shown in FIGS. 1-4. The housing portion 10 has laterally facing walls 34, 36 projecting forwardly of the rear wall 22 of the reel housing adjacent the lateral edges 38, 40 bounding the rectangular opening 24. The pivot structure on each wall 34, 36 is the same and thus description herein will be limited to the pivot structure on wall 36. Like reference numerals have been used on corresponding parts on the opposite sides of the thumb button.

The wall 36 has an integral pivot post 42 extending laterally inwardly. The post 42 has a curved outer surface 44 extending through substantially 180°. Beneath the pivot pin is a curved seat having a common center of curvature with the outer surface 44 of the post 42. The wall 36 is cut out to define a flat, downwardly facing surface 48 which, in conjunction with the curved seat 46, defines a substantially V-shaped opening forwardly of the reel. The downwardly facing surface 48 coincides with the flat bottom surface 50 of the pivot post 42.

The thumb button 20 has laterally spaced side walls 52, 54. The side wall 54 has a U-shaped seat 56 with a restricted entryway 58 of slightly lesser diameter than the diameter of the seat 56. Projecting laterally outwardly from the wall 52 is a post 60 having a curved guide surface 62 extending through approximately 90°.

To assemble the thumb button, the thumb button is positioned as shown in FIG. 1 i.e. pivoted from its forwardmost operating position shown in phantom in FIG. 2. In this position, the seat 56 opens upwardly towards the flat bottom surface 50 on the post 42. To seat the pivot post 42 in the seat 56, the thumb button is urged upwardly so that the post 42 cams the one leg 64 bounding the seat 56 so as to enlarge the restricted entryway 58 and allow passage of the post 42 so that the post 42 moves against the seat 56.

Rotation of the thumb button clockwise in FIG. 1 brings the U-shaped seat 56 bearingly against the outer surface 44 of the pivot post 42. At the same time the guide surface 62 on post 60 moves into the curved seat 46. The thumb button is thus free to pivot through the guide range shown in FIG. 2.

As can be seen clearly from FIG. 2, forward pressure on the upper region of the thumb button bears the seats 56 against the guide surfaces 44 on the pivot posts 42 and thus prohibits dislodging of the thumb button from the reel housing. Rearward movement of the thumb button relative to the housing is prohibited by the posts 60 encountering the curved seats 46. It is thus clear that with the thumb button assembled, separation of the thumb button from the housing in the range of operation of the thumb button is prohibited.

Another advantage of the structure as described is that the thumb button is positively guided by four pivot posts, which cooperate with an equal number of curved seats. A substantial contact area is established between the pivot posts and associated seats so that the thumb button is smoothly guided. At the same time, the thumb button is capable of being readily assembled. One simply orients the thumb button as in FIG. 1, presses the thumb button into place and pivots the thumb button to the FIG. 2 orientation.

It should be understood that the foregoing detailed description was made for purposes of demonstrating the inventive structure and the operation thereof, with no unnecessary limitations to be understood therefrom.

What is claimed is:

1. In a fishing reel of the type having a pivotable thumb button, a housing with an opening for accepting the thumb button, and a centershaft mounted for movement in a fore and aft direction relative to the housing, said thumb button being pivotable in a forward direction to effect forward shifting of the centershaft, improved structure for mounting the thumb button for pivoting movement relative to the housing comprising:

a laterally extending pivot post on the housing; and a forwardly opening U-shaped seat on the thumb button for guiding pivoting of the pivot post through an operating range for the thumb button between a fully aft position and a forward position wherein the thumb button is engaged with the center shaft with the center shaft in a fully forward operating position, said post having a surface facing into said U-shaped seat throughout said operating range so that said post abuts the seat to limit forward movement of said thumb button and thereby prevent inadvertent separation of the thumb button from the housing throughout the thumb button operating range, whereby inadvertent separation of the thumb button during operation of the reel is prevented.

2. The improved fishing reel according to claim 1 wherein at least one of the pivot post and seat is deformable and means are provided for snap-fitting the pivot post into the seat.

3. The improved fishing reel according to claim 1 wherein cooperating means are provided on the thumb button and housing for snap-fitting the pivot post in the seat with the thumb button in a first position wherein the thumb button is pivoted forwardly beyond said operating range.

4. In a fishing reel of the type having a thumb button, a housing with an opening for accepting the thumb button, and a centershaft mounted for movement in a fore and aft direction relative to the housing, improved structure for mounting the thumb button for pivoting movement relative to the housing comprising:

a laterally extending pivot post on each of the thumb button and housing;

a seat on each of the thumb button and housing for cooperating with the pivot posts to guide pivoting movement of the thumb button through an operating range for the thumb button between a fully aft position and a forward position wherein the thumb button is engaged with the center shaft with the center shaft in a fully forward operating position; and means on the thumb button and housing for admitting the pivot post for positioning against the seat with the thumb button pivoted to a first position forwardly beyond the forward position of the thumb button and for preventing separation of the pivot post from the seat with the thumb button situated in said operating range.

whereby inadvertent separation of the thumb button during operation of the reel is prevented.

5. The improved fishing reel according to claim 4 wherein the thumb button has two spaced sides and at least one of the two sides of the thumb button has a laterally extending pivot post and a seat and the housing has a pivot post and a seat which cooperate with the pivot post and seat on the one side of the thumb button to guide pivoting of the thumb button relative to the housing through said thumb button operating range.

6. In a fishing reel of the type having a thumb button with first and second spaced sides, a housing with an opening for accepting the thumb button and a centershaft mounted for movement in a fore and aft direction relative to the housing, improved structure for mounting the thumb button for pivoting movement relative to the housing comprising:

first and second laterally extending pivot posts on the first and second sides of the thumb button respectively;

each said first and second pivot posts having a guide surface;

first and second curved guide seats on the first and second sides of the thumb button;

third and fourth spaced, laterally extending pivot posts on the housing;

each said third and fourth pivots posts having a guide surface; and third and fourth spaced, curved guide seats on the reel housing;

said first and second pivot posts being positioned so that the guide surfaces on the first and second pivot posts bear against the third and fourth guide seats and thereby guide pivoting movement of the thumb button relative to the housing through an operating range for the thumb button between a fully aft position and a forward position wherein the thumb button is engaged with the center shaft with the center shaft in a fully forward operating position;

said third and fourth pivot posts being positioned so that the guide surfaces on the third and fourth pivot posts bear against the first and second guide seats and cooperate with the first and second pivot posts and third and fourth guide seats in guiding pivoting movement of the thumb button through said operating range.

7. The improved fishing reel according to claim 6 wherein said first, second, third and fourth guide seats have substantially a common center of curvature.

8. The improved fishing reel according to claim 7 wherein cooperating means are provided on the thumb button and housing for admitting at least one of the first, second, third and fourth pivot posts into cooperating first, second, third and fourth seats only with the thumb button pivoted to a position outside of the operating range for the thumb button, whereby inadvertent separation of the thumb button from the housing is prevented upon the thumb button being moved in said operating range.

9. The improved fishing reel according to claim 8 wherein at least one of the first, second, third and fourth pivot posts must be cammed into its respective seat with the thumb button pivoted to said position outside said operating range on the thumb button.

10. The improved fishing reel according to claim 7 wherein the curves surfaces on the first and second pivot posts extend through approximately 180°.

11. The improved fishing reel according to claim 10 wherein the curved surfaces on the third and fourth pivot posts extend through approximately 90°.

12. In a fishing reel of the type having a thumb button, a housing with an opening for accepting the thumb button, and a centershaft mounted for movement in a fore and aft direction relative to the housing, improved structure for mounting the thumb button for pivoting movement relative to the housing comprising:

laterally extending pivot posts on each of the thumb button and housing;

a seat on each of the thumb button and housing for cooperating with the pivot posts to guide pivoting movement of the thumb button through an operating range between a fully aft position and a forward position wherein the thumb button is engaged with the center shaft with the center shaft in a fully forward operating position, said pivot posts and seats cooperating to prevent inadvertent separation of the thumb button from the housing through said operating range.

13. The improved fishing reel according to claim 12 wherein the thumb button has laterally spaced sides and there is both a pivot post and seat on at least one of the laterally spaced sides.

* * * * *